US009823354B2

United States Patent
Isozaki et al.

(10) Patent No.: US 9,823,354 B2
(45) Date of Patent: Nov. 21, 2017

(54) ILLUMINANCE MEASURING SYSTEM (71) Applicant: TOPCON Corporation, Tokyo-to (JP)

(72) Inventors: Hisashi Isozaki, Tokyo-to (JP); Atsushi Shoji, Tokyo-to (JP); Akira Ooide, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 0 days.

(21) Appl. No.: 15/207,894

(22) Filed: Jul. 12, 2016

(65) Prior Publication Data
US 2017/0023351 A1    Jan. 26, 2017

(30) Foreign Application Priority Data

Jul. 21, 2015 (JP) ................. 2015-144009

(51) Int. Cl.
*G01J 1/00* (2006.01)
*G01S 17/66* (2006.01)
(Continued)

(52) U.S. Cl.
CPC ............. *G01S 17/66* (2013.01); *G01J 1/0219* (2013.01); *G01J 3/0264* (2013.01)

(58) Field of Classification Search
CPC ........ G01J 1/4257; G01J 9/00; G01M 11/061; G01M 11/064; G01M 11/06
(Continued)

(56) References Cited

U.S. PATENT DOCUMENTS 6,614,518 B1 * 9/2003 Ishikawa .................. G01J 1/42
356/215

8,471,906 B2 * 6/2013 Belenkii ................ G01C 21/02
348/144

(Continued)

FOREIGN PATENT DOCUMENTS

JP         4-204006 A    7/1992
JP         6-117923 A    4/1994
(Continued)

*Primary Examiner* — Tarifur Chowdhury
*Assistant Examiner* — Md M Rahman
(74) *Attorney, Agent, or Firm* — Nields, Lemack & Frame, LLC (57) ABSTRACT

The invention provides an illuminance measuring system, which comprises an illuminance measuring instrument which comprises a first communication unit and is moved by a moving vehicle, a position measuring means which comprises a second communication unit and is capable of measuring a three-dimensional position of the illuminance measuring instrument and a data collector which comprises a third communication unit and a storage unit for storing positional information data of a predetermined measuring point, wherein the data collector moves the moving vehicle to the measuring point based on a position of the illuminance measuring instrument as measured by the position measuring means and the positional information data, an illuminance is measured by the illuminance measuring instrument and a position of the illuminance measuring instrument at the time of illuminance measurement is measured by the position measuring means, and wherein the data collector obtains an illuminance measurement result from the illuminance measuring instrument via the first communication unit and the third communication unit, obtains a measuring position from the position measuring means via the second communication unit and the third communication unit, and collects the illuminance measurement result and the measuring position in association with each other.

12 Claims, 4 Drawing Sheets

(51) Int. Cl.
  *G01J 1/02*    (2006.01)
  *G01J 3/02*    (2006.01)
(58) Field of Classification Search
  USPC .......................................................... 356/121
  See application file for complete search history.

(56) References Cited

U.S. PATENT DOCUMENTS

2005/0151947 A1\* 7/2005 Fujimaki ............. G03F 7/70775
  355/55
2010/0296082 A1\* 11/2010 Ohkubo ................... G01J 1/02
  356/236

FOREIGN PATENT DOCUMENTS

| JP | 7-280645 A | 10/1995 |
| JP | 10-9951 A | 1/1998 |
| JP | 10-288549 A | 10/1998 |
| JP | 2005-140644 A | 6/2005 |

\* cited by examiner

ILLUMINANCE MEASURING SYSTEM

BACKGROUND OF THE INVENTION

The present invention relates to an illuminance measuring system which performs measurement of an illuminance at a predetermined position or performs measurement of an illuminance condition such as an illuminance distribution, or the like, over a wide range.

Conventionally, in a case of performing an optical measurement (an illuminance measurement), for instance, by making a person serving as a marker stand at a measuring point or by marking the measuring point, or the like, the measuring point is clarified. Further, a worker carries an illuminance measuring instrument to the measuring point, maintains the illuminance measuring instrument in a measuring posture at the measuring point and measures the illuminance.

At a time of measuring the illuminance, it is necessary for the worker to consider his posture so that the shadow of the worker does not prevent a light from entering the illuminance measuring instrument. Further, another worker records a measurement result by hand for each measurement of the illuminance, finally summarized the measurement results and performs a data entry.

Further, in the illuminance measurement in a wide range such as a baseball field or an athletic field, there is a limit and the like in a lighting time of illuminating lamps. Therefore, the measurement must be finished in a short time and many people must perform the measurement at the same time.

Therefore, in the conventional illuminance measurement, many workers are required, a measurement work takes time and there is a possibility that individual differences of the workers are produced per each measurement.

SUMMARY OF THE INVENTION

It is an object of the present invention to provide an illuminance measuring system which enables a measurement by a small number of people and improve the measurement efficiency.

To attain the object as described above, an illuminance measuring system according to the present invention comprises an illuminance measuring instrument which comprises a first communication unit and is moved by a moving vehicle, a position measuring means which comprises a second communication unit and is capable of measuring a three-dimensional position of the illuminance measuring instrument and a data collector which comprises a third communication unit and a storage unit for storing positional information data of a predetermined measuring point, wherein the data collector moves the moving vehicle to the measuring point based on a position of the illuminance measuring instrument as measured by the position measuring means and the positional information data, an illuminance is measured by the illuminance measuring instrument and a position of the illuminance measuring instrument at the time of illuminance measurement is measured by the position measuring means, and wherein the data collector obtains an illuminance measurement result from the illuminance measuring instrument via the first communication unit and the third communication unit, obtains a measuring position from the position measuring means via the second communication unit and the third communication unit, and collects the illuminance measurement result and the measuring position in association with each other.

Further, in the illuminance measuring system according to the present invention, the positional information data is sectioned by a mesh having predetermined intervals, and the data collector automatically moves the moving vehicle to the measuring point as specified by the mesh and controls the illuminance measuring instrument and the position measuring means so as to automatically perform the illuminance measurement and the position measurement of each measuring point.

Further, in the illuminance measuring system according to the present invention, the illuminance measurement by the illuminance measuring instrument is executed with respect to all of the measuring points as specified by the mesh, and the data collector creates a three-dimensional illuminance distribution of the measuring points based on the illuminance measurement results and the position measurement results as collected.

Further, in the illuminance measuring system according to the present invention, the position measuring means includes a laser surveying instrument which comprises a tracking unit, a distance measuring unit, a horizontal angle measuring unit, an elevation angle measuring unit and the second communication unit, and an omnidirectional prism provided at a known position on the moving vehicle, wherein the illuminance measuring instrument is provided at a known position with respect to the moving vehicle, and wherein the laser surveying instrument is adapted to track the omnidirectional prism, to perform a distance measurement, a horizontal angle measurement and an elevation angle measurement, and to transmit the measurement results to the data collector via the second communication unit.

Further, in the illuminance measuring system according to the present invention, the position measuring means is a GPS device as provided at a known position on the moving vehicle, a three-dimensional position of the illuminance measuring instrument is obtained by the GPS device, and the three-dimensional position of the illuminance measuring instrument is transmitted to the data collector via the second communication unit.

Further, in the illuminance measuring system according to the present invention, the position measuring means further comprises an azimuth angle sensor.

Furthermore, in the illuminance measuring system according to the present invention, the illuminance measuring instrument has a spectral measuring function.

According to the present invention, the illuminance measuring system comprises an illuminance measuring instrument which comprises a first communication unit and is moved by a moving vehicle, a position measuring means which comprises a second communication unit and is capable of measuring a three-dimensional position of the illuminance measuring instrument and a data collector which comprises a third communication unit and a storage unit for storing positional information data of a predetermined measuring point, wherein the data collector moves the moving vehicle to the measuring point based on a position of the illuminance measuring instrument as measured by the position measuring means and the positional information data, an illuminance is measured by the illuminance measuring instrument and a position of the illuminance measuring instrument at the time of illuminance measurement is measured by the position measuring means, and wherein the data collector obtains an illuminance measurement result from the illuminance measuring instrument via the first communication unit and the third communication unit, obtains a measuring position from the position measuring means via the second communication unit and the third communication unit, and collects the illuminance measurement result and the measuring position in association with each other. As a result, it is not necessary for a worker to carry the illuminance measuring instrument to the measuring point, number of workers can be reduced and the measurement efficiency can be improved.

Further, according to the present invention, the positional information data is sectioned by a mesh having predetermined intervals, and the data collector automatically moves the moving vehicle to the measuring point as specified. by the mesh and controls the illuminance measuring instrument and the position measuring means so as to automatically perform the illuminance measurement and the position measurement of each measuring point. As a result, it is not necessary for the worker to perform a work such as a recording or a summarizing of the measurement results or the like, a measurement error caused by each worker can be avoided and a measurement accuracy and the measurement efficiency can be improved.

Further, according to the present invention, the illuminance measurement by the illuminance measuring instrument is executed with respect to all of the measuring points as specified by the mesh, and the data collector creates a three-dimensional illuminance distribution of the measuring points based on the illuminance measurement results and the position measurement results as collected. As a result, an illuminance measurement result can be obtained over a wide range corresponding to a shape of a measurement range and a usefulness can be improved.

Further, according to the present invention, the position measuring means includes a laser surveying instrument which comprises a tracking unit, a distance measuring unit, a horizontal angle measuring unit, an elevation angle measuring unit and the second communication unit, and an omnidirectional prism provided at a known position on the moving vehicle, wherein the illuminance measuring instrument is provided at a known position with respect to the moving vehicle, and wherein the laser surveying instrument is adapted to track the omnidirectional prism, to perform a distance measurement, a horizontal angle measurement and an elevation angle measurement, and to transmit the measurement results to the data collector via the second communication unit. As a result, the worker does not have to move to the measuring point, and it is possible to realize the efficient illuminance measurement in a wide range.

Further, according to the present invention, the position measuring means is a GPS device as provided at a known position on the moving vehicle, a three-dimensional position of the illuminance measuring instrument is obtained by the GPS device, and the three-dimensional position of the illuminance measuring instrument is transmitted to the data collector via the second communication unit. As a result, the worker does not have to move to the measuring point, and it is possible to realize the efficient illuminance measurement in a wide range.

Further, according to the present invention, the position measuring means further comprises an azimuth angle sensor. As a result, even if the illuminance measuring instrument is provided at a position apart from the moving vehicle, the position of the illuminance measurement device can be measured irrespective of a direction of the moving vehicle.

Furthermore, according to the present invention, the illuminance measuring instrument has a spectral measuring function. As a result, a composition of a light as illuminated can be measured simultaneously with the illuminance.

DETAILED DESCRIPTION OF THE PREFERRED EMBODIMENT

A description will be given below on embodiments of the present invention by referring to the attached drawings.

First, referring to FIG. 1 and FIG. 2, a description will be given on an illuminance measuring system according to a first embodiment of the present invention.

Figure 1:
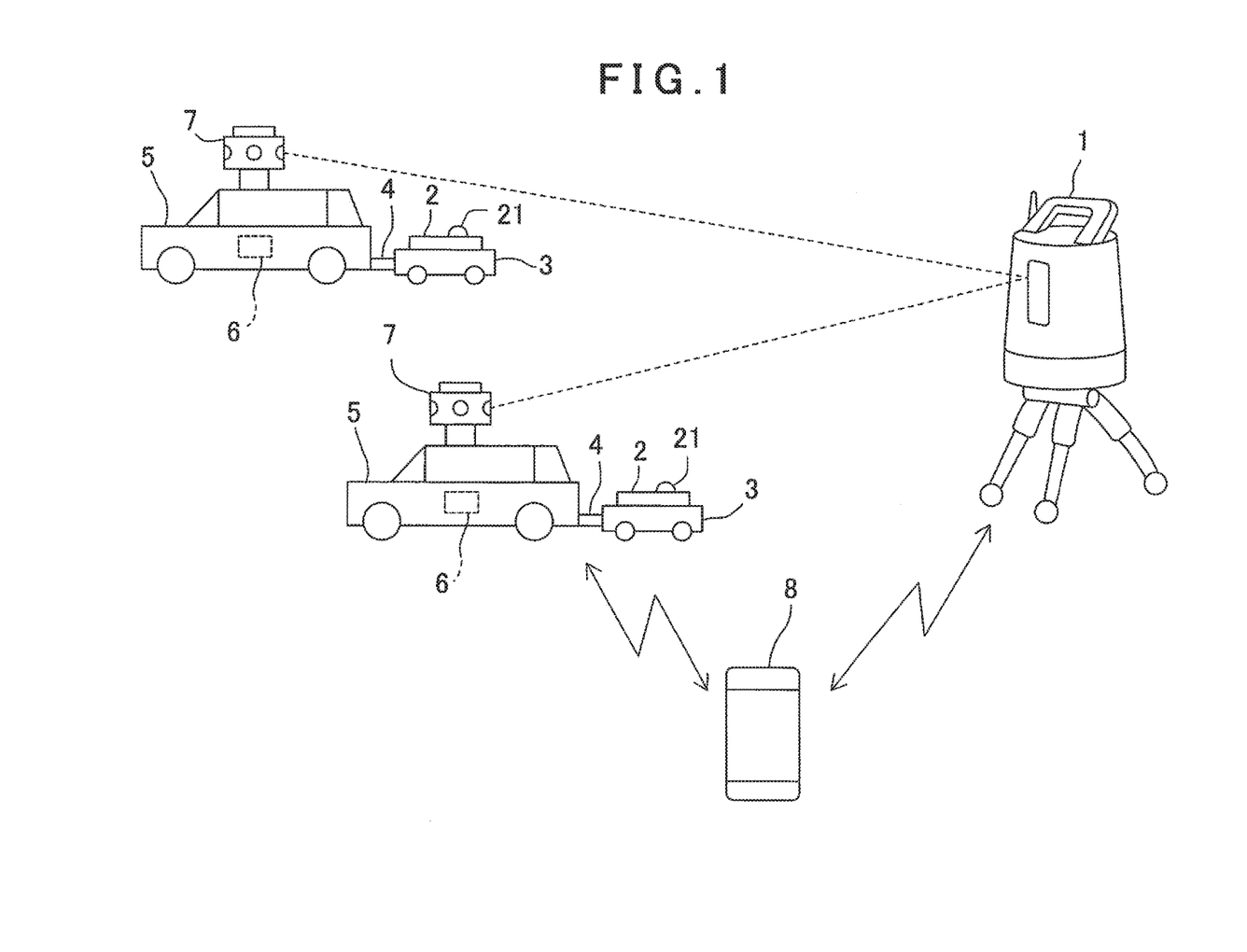
FIG. 1 is a schematical drawing of an illuminance measuring system according to a first embodiment of the present invention.
Figure 2:
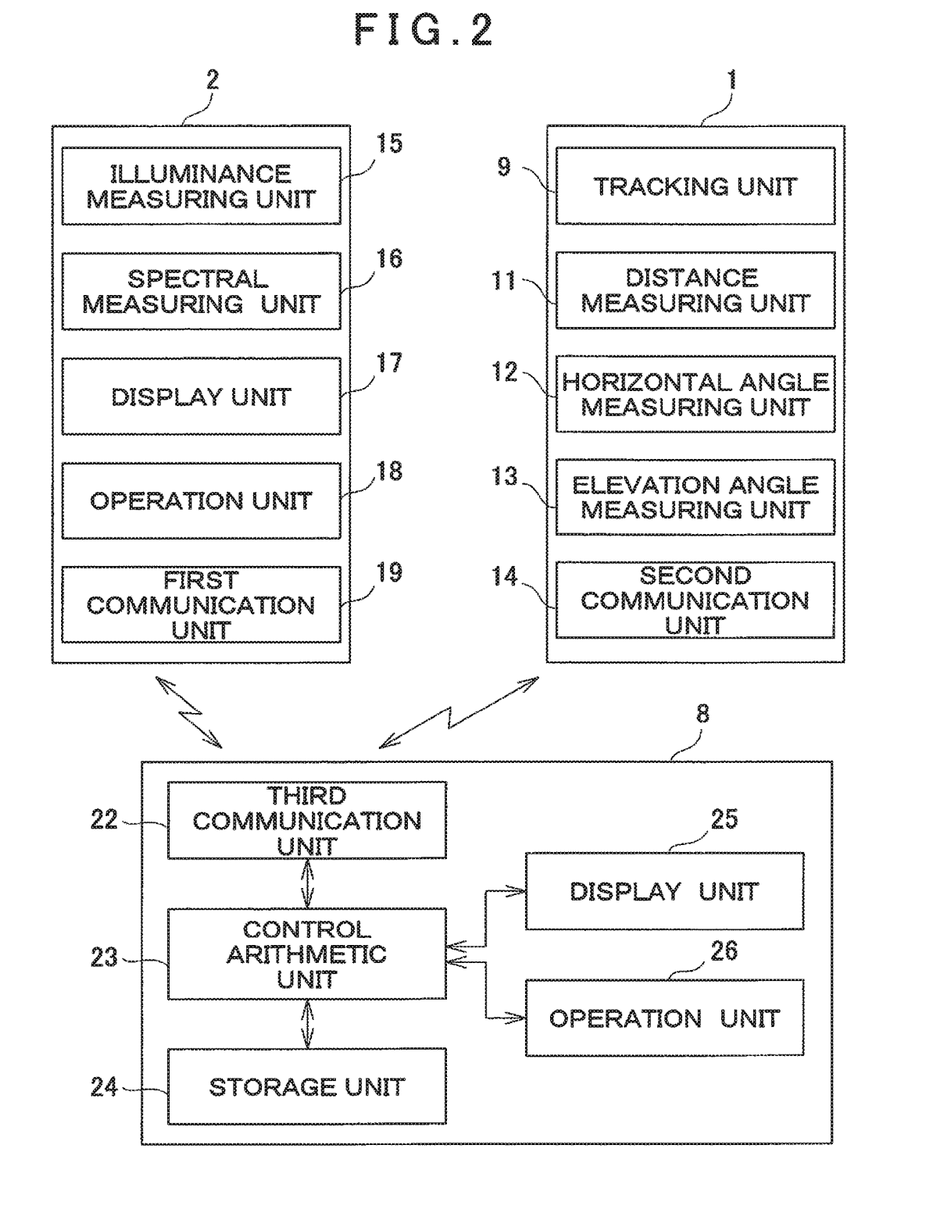
FIG. 2 is a schematical block diagram of the illuminance measuring system according to the first embodiment of the present invention.

In FIG. 1, reference numeral 1 denotes a laser surveying instrument. The laser surveying instrument 1 has a tracking function. The laser surveying instrument 1 is capable of tracking an object to be measured, performing a distance measurement to the object to the measured, and measuring a horizontal angle and an elevation angle.

Further, reference numeral 2 denotes an illuminance measuring instrument and the illuminance measuring instrument has a function of measuring an illuminance. Further, the illuminance measuring instrument 2 may have a spectral measuring function for measuring a composition of a wavelength of an illuminating light. Reference numeral 3 denotes a cart, on which the illuminance measuring instrument 2 is mounted, and the cart 3 is coupled with a moving vehicle 5 such as a radio control car and the like via a coupling bar 4.

In the moving vehicle 5, an azimuth angle sensor 6, which detects a direction of the moving vehicle 5, is incorporated and an omnidirectional prism 7 is provided at a known position on the moving vehicle 5. Further, in FIG. 1, reference numeral 8 denotes a data collector, and the data collector 8 collects and stores measurement results of the laser surveying instrument 1 and measurement results of the illuminance measuring instrument 2.

The moving vehicle 5 and the cart 3 are fixedly coupled by the coupling bar 4 so that a positional relation of the cart 3 with respect to the moving vehicle 5 does not change. A positional relation between the omnidirectional prism 7 and the illuminance measuring instrument 2, i.e., a light sensing unit 21 (to be described later) is already known. Further, the coupling bar 4 has a length which can assure a sufficient distance from the moving vehicle 5 so that the measurement of the illuminance measuring instrument 2 cannot be affected. Further, a position measuring means of the illuminance measuring instrument 2 is constituted by the laser surveying instrument 1, the omnidirectional prism 7, and others.

The laser surveying instrument 1 is installed at a known point. It is to be noted that, in a case where the measurement is performed in a building and the like, it will suffice if a relative position in the building is determined, for instance, a position from a wall surface or the like is already measured. The laser surveying instrument 1 has a tracking unit 9, a distance measuring unit 11, a horizontal angle measuring unit 12, an elevation angle measuring unit 13, a second communication unit 14, and others.

The tracking unit 9 projects a tracking light towards an object to be measured (here, the omnidirectional prism 7) receives a reflected light and tracks the omnidirectional prism 7. The distance measuring unit 11 projects a distance measuring light to the omnidirectional prism 7, receives a reflected light from the omnidirectional prism 7 and performs distance measurement. The horizontal angle measuring unit 12 measures a horizontal angle of the omnidirectional prism 7 with reference to the laser surveying instrument 1 at a time when the distance measurement is performed. Further, the elevation angle measuring unit 13 measures an elevation angle of the omnidirectional prism 7 with reference to the laser surveying instrument 1 at a time when the distance measurement is performed. Therefore, a three-dimensional position of the omnidirectional prism 7 is measured with reference to the laser surveying instrument 1.

The second communication unit 14 performs a data communication with the data collector 8 by an appropriate method such as a wired or a wireless method. A measurement result by the distance measuring unit 11, a measurement result by the horizontal angle measuring unit 12 and a measurement result by the elevation angle measuring unit 13 are transmitted to the data collector 8 via the second communication unit 14.

The illuminance measuring instrument 2 is portable (a handheld type), can perform an illuminance measurement and a spectral measurement as a single unit and can be attached to or detached from the cart 3. Further, the illuminance measuring instrument 2 has an illuminance measuring unit 15, a spectral measuring unit 16, a display unit 17, an operation unit 18, a first communication unit 19 and others.

The illuminance measuring instrument 2 has the light sensing unit 21 (see FIG. 1) and by directing the light sensing unit 21 toward a reaching direction of the light, the light sensing unit 21 receives the light. When a light receiving signal from the light sensing unit 21 is input to the illuminance measuring unit 15, an illuminance is measured. Further, when the light receiving signal is input to the spectral measuring unit 16, a composition of a wavelength which constitutes the light is measured (spectral measurement). It is to be noted that, in a case where the illuminance measurement alone will suffice, the spectral measuring unit 16 can be omitted.

The operation unit 18 is capable of inputting various instructions required for the illuminance measurement such as an illuminance measurement instruction and the like. The display unit 17 is designed so as to display information regarding the illuminance measurement such as a measurement result of the illuminance and the like.

The first communication unit 19 performs a data communication with the data collector 8 by an appropriate method such as a wired or a wireless method. An illuminance measurement result by the illuminance measuring unit 15 and a spectral measurement result by the spectral measuring unit 16 are transmitted to the data collector 8 via the first communication unit 19.

The data collector 8 primarily comprises a third communication unit 22, a control arithmetic unit 23, a storage unit 24, a display unit 25, an operation unit 26, and others.

The third communication unit 22 is capable of performing a data communication with the second communication unit 14 and the first communication unit 19 by an appropriate method such as a wired or a wireless method.

Various programs are stored in the storage unit 24. These programs include: a control program for moving the moving vehicle 5 and guiding to a predetermined measuring point, a control program for making the laser surveying instrument 1 to execute a surveying, a measurement program for measuring a position of the illuminance measuring instrument 2, i.e. the light sensing unit 21 based on a measurement result of the laser surveying instrument 1 and a positional relation between the omnidirectional prism 7 and the illuminance measuring instrument 2, a control program for making the illuminance measuring instrument 2 to execute the illuminance measurement, a data management program for storing a measurement result from the laser surveying instrument 1 and a measurement result from the illuminance measuring instrument 2 in association with each other, an input/output control program for capturing an operation in the operation unit 26 as an instruction signal and creating a command corresponding to the operation or for displaying a measurement state, a measurement result and the like on the display unit 25, a 3D illuminance display program for displaying an illuminance measurement result as a three-dimensional display on the display unit 25 based on the measurement result from the as surveying instrument 1 and the measurement result from the illuminance measuring instrument 2, and other programs.

Further, in the storage unit 24, positional information data for performing a measurement at a predetermined measuring position, measurement sequence data in which a measuring order is determined when there is a plurality of measuring positions, a measurement result of the laser surveying instrument 1, a measurement result of the illuminance measuring instrument 2, and the like, are stored. Further, in a case where an illuminance measurement is performed in a building, three-dimensional data of the building and a stereoscopic image of the building may be stored.

When the object to be measured is a wide range such as an athletic field and the like, the positional information data is, for instance, data sectioned in a mesh form having intervals of 10 m based on a measurement range (intersection data of the mesh). Further, each mesh interval of the positional information data is appropriately set in accordance with a range of the object to be measured or a measurement distribution as required.

It is to be noted that a touch panel is used as the display unit 25 and the display unit 25 may function as both the display unit 25 and the operation unit 26.

Further, as the data collector 8, various devices can be used. For instance, a PDA or a smartphone, which is a portable terminal, may be used, or a portable PC may be used. Further, a general installation type PC may be used. Further, it is desirable that the data collector 8 incorporates a clock. The data collector 8 enables a remote control over the moving vehicle 5.

Next, a description will be given on an illuminance measurement processing by the illuminance measuring system according to the first embodiment.

In a case where the illuminance measurement is performed in a predetermined region such as a hall, a factory, an athletic field, a hospital, a commercial facility, or the like, a reference position for installing the laser surveying instrument 1 is set first.

As the reference position where the laser surveying instrument 1 is installed, an arbitrary position such as a position where the entire measurement range can be seen, will suffice. The position as set is specified by a measurement of a distance to a wall surface, and the like, or is set by selecting a position which serves as a reference from a drawing or the like, and the position as selected is set as the reference position (the position as set is determined as a known position).

Next, the moving vehicle 5 is moved to a first measuring point (an intersection of the mesh) based on a current position of the illuminance measuring instrument 2 as measured by the laser surveying instrument 1 and the positional information data as sectioned by the mesh as set in advance. It is to be noted that, to realize a moving to a first measuring point, the moving vehicle 5 may be remotely controlled by the data collector 8, or an operator may carry and install the moving vehicle 5. In this case, there is no need to measure the current position of the illuminance measuring instrument 2. When the moving vehicle 5 is installed at the measuring point, a measurement instruction (a measurement command) is issued from the data collector 8 to the laser surveying instrument 1 and the illuminance measuring instrument 2.

When the measurement command is received, the laser surveying instrument 1 executes a distance measurement, a horizontal angle measurement and an elevation angle measurement with respect to the omnidirectional prism 7. Further, the laser surveying instrument 1 measures a position of the illuminance measuring instrument 2 with respect to the omnidirectional prism 7 based on a measurement result, a detection result of the azimuth angle sensor 6 (a direction of the moving vehicle 5) and a positional relation between the omnidirectional prism 7 and the illuminance measuring instrument 2.

By measuring a three-dimensional position of the omnidirectional prism. 7, a three-dimensional position of the illuminance measuring instrument 2 can be measured. Therefore, the laser surveying instrument 1 measures a position of the object to be measured, i.e. the omnidirectional prism 7 and also measures a position of the illuminance measuring instrument 2.

Further, the illuminance measuring instrument 2 measures an illuminance in parallel with the position measurement of the laser measuring instrument 1 and a measurement result is transmitted to the data collector 8.

The data collector 8 associates a distance measurement result, a horizontal angle measurement result and an elevation angle measurement result (three-dimensional positional information of the measuring point) as provided by the laser surveying instrument 1, and an illuminance measurement result (the illuminance information) as provided by the illuminance measuring unit 2, and stores in the storage unit 24. Further, the data collector 8 may use the clock as incorporated, associate a time at which the measurement command is issued with the measurement results and stores in the storage unit 24.

When the three-dimensional position measurement at the measuring point and the illuminance measurement at the measuring point are finished, a direction of the moving vehicle 5 is measured based on the positional information data and the azimuth angle sensor 6. A moving direction of the moving vehicle 5 is obtained based on the direction of the moving vehicle 5 and the three-dimensional position, and the data collector 8 moves the moving vehicle 5 to a next measuring point. The three-dimensional position measurement and the illuminance measurement are likewise carried out on the next measuring point and a measurement result regarding each measuring point is accumulated in the data collector 8. A spectral measurement result is also associated with the measurement result of the measuring point together with the illuminance measurement result and accumulated.

Regarding an illuminance information between the measuring points, since accurate three-dimensional positional informations of the measuring points can be acquired, the illuminance information can be interpolated by a proportional calculation based on the positional information of each measuring point and the illuminance information of each measuring point.

In the illuminance measurement according to the present embodiment, it is possible to collect the accurate three-dimensional positional information of each measuring point and the information of the measurement over a wide range, which contributes to the improvement of the measurement accuracy.

The data collector 8 can create a three-dimensional illuminance distribution map based on the three-dimensional positional information and the illuminance information, as collected, with respect to each measuring point. Further, by superimposing the illuminance distribution map on an image of the measurement region based on positional coordinates of the measuring points, the three-dimensional illuminance information of the measurement range, which is capable of being easily judged by visuality, is acquired.

The three-dimensional illuminance information of the measurement range is displayed on the display unit 25 by various methods. For instance, an illuminance of the measuring point may be displayed by a contrast or displayed by a bar graph or the like. Further, the three-dimensional illuminance information may be displayed on the display unit 25 in a text format or a CSV format. Further, a maximum value and a minimum value of discrepancies in measurement results may be displayed on the display unit 25.

Further, in the present embodiment, the cart 3 is moved by the small moving vehicle 5 with a low height such as a radio control car. Therefore, the illuminance measuring instrument 2 can be prevented from hiding behind the moving vehicle 5 and a hindrance of light entering on the illuminance measuring instrument 2 can be suppressed, and a measurement accuracy of the illuminance measuring instrument 2 can be improved.

Further, since the illuminance measuring instrument 2 can be automatically moved by the moving vehicle 5, an operator does not have to carry the illuminance measuring instrument 2 to the measuring point, there is no need to indicate the measuring point and the number of workers can be reduced.

Further, a measurement result provided by the illuminance measuring instrument 2 is formed into data, transmitted to the data collector 8 and accumulated. Therefore, operations such as recording or summarizing of the measuring results is no longer necessary, a measurement error caused due to an individual difference of the workers can be avoided, and a measurement accuracy and the measurement efficiency can be improved.

It is to be noted that, in addition to the azimuth angle sensor 6, a tilt angle sensor may be further provided on the moving vehicle 5. By providing the tilt angle sensor, a position of the illuminance measuring instrument 2 with respect to the omnidirectional prism 7 can be accurately measured even in a case where a region to be measured is tilted.

Further, after measurement is completed at each measuring point, the control arithmetic unit 23 may be configured to carry out a confirmation processing to confirm an accuracy of a measurement result. The measurement is finished when the measurement result is within a threshold value as set in advance, the measurement is performed again when the measurement result is out of the threshold value, and an accuracy of the measurement result is confirmed again. By performing a conformation processing after the completion of the measurement, a measurement accuracy of the illuminance measuring instrument 2 can be further improved.

Further, outside or inside a building where an external light enters, although a brightness varies depending on a time, by associating the illuminance measurement with the time, a difference in illuminance caused due to the time zones can also be recorded.

Further, although an LED lighting has spread in recent years, in the LED lighting, a composition of a wavelength of the LED lighting is different from a sunlight, an incandescent light and the like, due to light emission characteristics of the LED. By performing a spectral measurement, it becomes possible to make not only a response to the brightness but also a response considering an influence on human bodies.

Further, in a plant factory, there is a case where a wavelength effective for a growth of plants is selected and irradiated. Since an illuminance and a wavelength distribution can be measured at the same time, the plant factory can be operated more effectively.

Figure 3A:
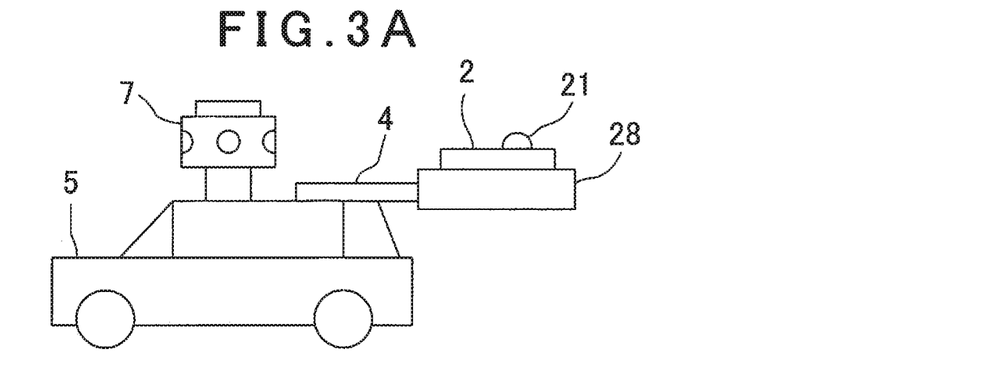
FIG. 3A to FIG. 3C show modification of a case where an installing position of an illuminance measuring instrument is changed.
Figure 3B:
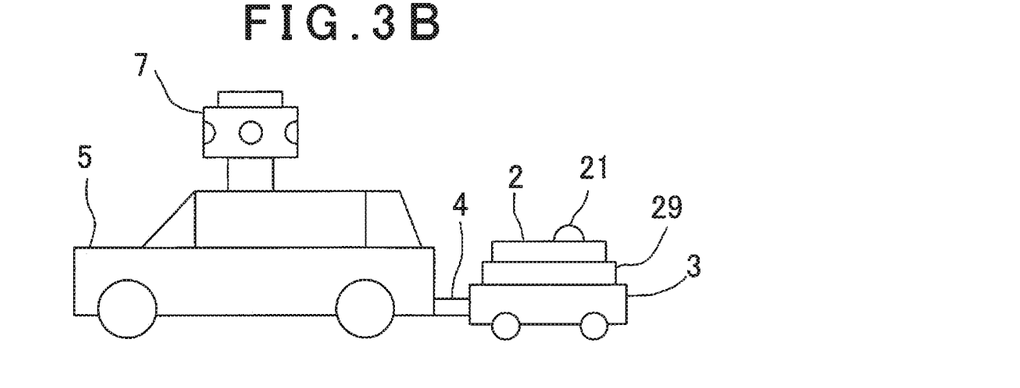
Figure 3C:
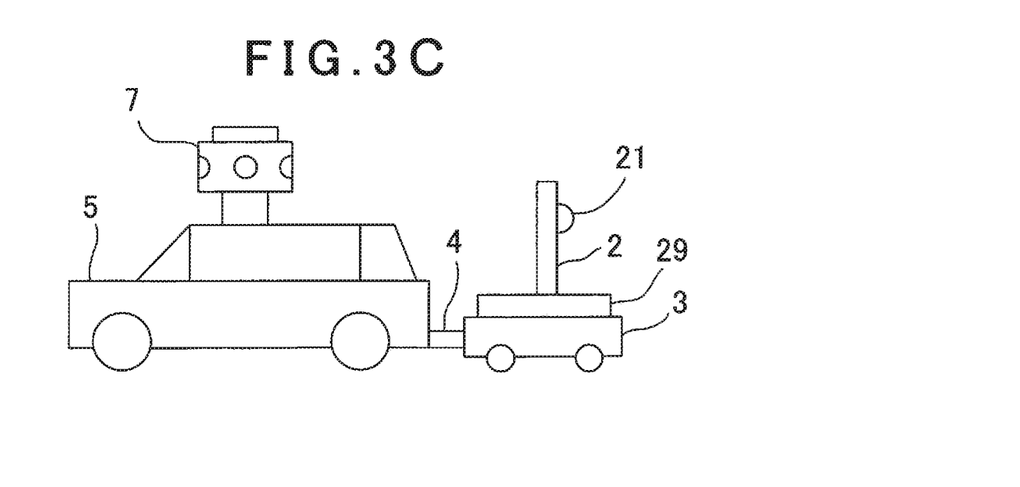

FIG. 3A to FIG. 3C show a modification of the first embodiment.

In FIG. 3A, the coupling bar 4 is fixed on an upper surface of the moving vehicle 5. Further, a base unit 28 is fixed on an end portion of the coupling bar 4 and the illuminance measuring instrument 2 is mounted on the base unit 28.

When the illuminance measuring instrument 2 is fixedly provided to the moving vehicle 5 via the base unit 28 and the coupling bar 4, height positions of the omnidirectional prism 7 and the illuminance measuring instrument 2 can be aligned and a position measurement of the illuminance measuring instrument 2 with respect to the omnidirectional prism 7 becomes easy.

Further, in FIG. 3B, a gimbal mechanism 29 is provided on the cart 3 and the illuminance measuring instrument 2 is mounted via the gimbal mechanism 29. By providing the illuminance measuring instrument 2 via the gimbal mechanism 29, a posture of the illuminance measuring instrument 2 is constantly maintained on the level, adequate data can be acquired regardless of a presence/absence of a tilt of a running surface, and a measurement accuracy can be improved.

Further, in FIG. 3C, the illuminance measuring instrument 2 is mounted in an upright condition on the gimbal mechanism 29. When the illuminance measuring instrument 2 is set in the upright condition, i.e. when the light sensing unit 21 is in a vertical condition and is set sideways, an illuminance from a horizontal direction can be measured.

It is to be noted that, as a method for installing the illuminance measuring instrument 2, the illuminance measuring instrument 2 may be disposed at any other position as long as the illuminance measuring instrument 2 is at a position which does not obstruct a light entering with respect to the illuminance measuring instrument 2 when measuring an illuminance. For instance, it is needless to say that the illuminance measuring instrument 2 may be directly mounted on the moving vehicle 5.

Figure 4:
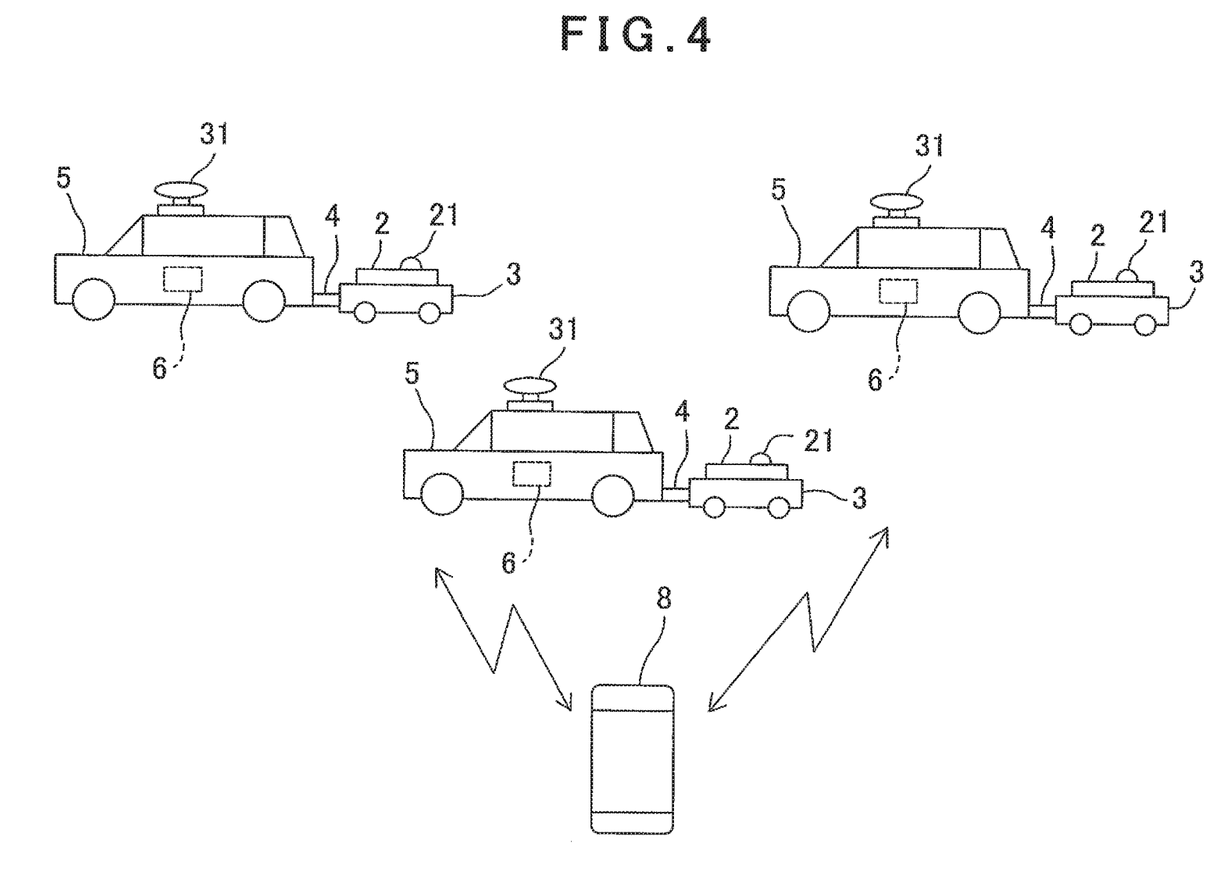
FIG. 4 is a schematical drawing of an illuminance measuring system according to a second embodiment of the present invention.

Next, referring to FIG. 4, description will be given on an illuminance measuring system according to a second embodiment of the present invention. It is to be noted that, in FIG. 4, what are equivalent to components as shown in FIG. 1 are referred by the same symbol, and detailed description thereof will be omitted.

The second embodiment is applied to a case where an illuminance measurement is performed in a predetermined outdoor region such as an athletic stadium, a baseball field, or the like. In the second embodiment, a GPS device 31 is provided at a known position on a moving vehicle 5. Any other structures are the same as that of the first embodiment. The GPS device 31 and others constitute a position measuring means for measuring a position of a light sensing unit 21. The GPS device 31 has a second communication unit (not shown), and can transmit positional information to a data collector 8 via the second communication unit.

Based on a three-dimensional positional information as received by the GPS device 31 from a GPS satellite (not shown) and mesh-like positional information data as previously stored in a storage unit 24 (see FIG. 2), the data collector 8 makes the moving vehicle 5 move to a measuring point (an intersection of the mesh) along the mesh.

While the moving vehicle 5 is moving, the positional information is acquired from the GPS device 31 in real time. When a measurement instruction. (a measurement command) is issued from the data collector 8 to the GPS device 31 and an illuminance measuring instrument 2, the positional information of the moving vehicle 5 at the time of receiving the measurement command is acquired. Based on the positional information and an azimuth angle as detected by an azimuth angle sensor 6, a position of the illuminance measuring instrument 2, i.e. a position of the light sensing unit 21, is measured. Disposing position data of the illuminance measuring instrument 2 is compared with the positional information data of the measuring point by the data. collector 8, and the moving vehicle 5 is guided so that a current position coincides with a measuring position.

Further, the illuminance measuring instrument 2 measures an illuminance in parallel with the positional measurement by the GPS device 31 and a position measurement result of the GPS device 31 and an illuminance measurement result of the illuminance measuring instrument 2 are transmitted to the data collector 8. Since the subsequent processing is the same as that of the first embodiment, a detailed description thereof will be omitted.

In the second embodiment, the positional information can be acquired by the GPS device 31 and the position measurement of the illuminance measuring instrument 2 can be performed based on the positional information as acquired. Therefore, a laser surveying instrument 1 (see FIG. 1) is not necessary and a device configuration can be simplified.

It is to be noted that, in the first embodiment and the second embodiment, although either one of a laser surveying instrument 1 (see FIG. 1), an omnidirectional prism 7 (see FIG. 1) and a GPS device 31 (see FIG. 4) is provided, but both the omnidirectional prism 7 and the GPS device 31 may be provided on the moving vehicle 5, and a measurement by the laser surveying instrument 1 and a measurement by the GPS device 31 may be properly used in accordance with measurement locations such as an inside or an outside of a building, and the like.

Further, in the first embodiment and the second embodiment, the moving vehicle 5 is automatically moved to a measurement starting point, i.e. a first measuring point, based on the positional information data as stored in the storage unit 24 in advance, but a worker may manually move the moving vehicle 5 based on the positional information data as displayed on the display unit 25 (see FIG. 2) of the data collector 8.

Further, in the first embodiment and the second embodiment, the azimuth angle sensor 6 built in the moving vehicle 5 is provided. On the other hand, in a case where the omnidirectional prism 7 and the light sensing unit 21 are coaxial and the GPS device 31 or the light sensing unit 21 are coaxial, since a positional relation between the omnidirectional prism 7 and the light sensing unit 21 or a positional relation between the GPS device 31 and the light sensing unit 21 does not change regardless of a direction of the moving vehicle 5, the azimuth angle sensor 6 may be omitted.

Further, in the first embodiment and the second embodiment, even though a radio control car is used as the moving vehicle 5, any other device may be used as long as the device is a remotely controllable, such as a radio control boat or a UAV (Unmanned Air Vehicle), or the like.

The invention claimed is:

1. An illuminance measuring system comprising; an illuminance measuring instrument which comprises a first communication unit and is moved by a moving vehicle, a position measuring means which comprises a second communication unit and is capable of measuring a three-dimensional position of said illuminance measuring instrument and a data collector which comprises a third communication unit and a storage unit for storing positional information data of a predetermined measuring point, wherein said data collector moves said moving vehicle to said measuring point based on a position of said illuminance measuring instrument as measured by said position measuring means and said positional information data, an illuminance is measured by said illuminance measuring instrument and a position of said illuminance measuring instrument at the time of illuminance measurement is measured by said position measuring means, and wherein said data collector obtains an illuminance measurement result from said illuminance measuring instrument via said first communication unit and said third communication unit, obtains a measuring position from said position measuring means via said second communication unit and said third communication unit, and collects the illuminance measurement result and the measuring position in association with each other, and wherein said position measuring means includes a laser surveying instrument which comprises a tracking unit, a distance measuring unit, a horizontal angle measuring unit, an elevation angle measuring unit and said second communication unit, and an omnidirectional prism provided at a known position on said moving vehicle, wherein said illuminance measuring instrument is provided at a known position with respect to said moving vehicle, and wherein said laser surveying instrument is adapted to track said omnidirectional prism, to perform a distance measurement, a horizontal angle measurement and an elevation angle measurement, and to transmit the measurement results to said data collector via said second communication unit.

2. The illuminance measuring system according to claim 1, wherein said positional information data is sectioned by a mesh having predetermined intervals, and said data collector automatically moves said moving vehicle to said measuring point as specified by said mesh and controls said illuminance measuring instrument and said position measuring means so as to automatically perform the illuminance measurement and the position measurement of each measuring point.

3. The illuminance measuring system according to claim 2, wherein the illuminance measurement by said illuminance measuring instrument is executed with respect to all of said measuring points as specified by said mesh, and said data collector creates a three-dimensional illuminance distribution of said measuring points based on said illuminance measurement results and said position measurement results as collected.

4. The illuminance measuring system according to claim 3, wherein said illuminance measuring instrument has a spectral measuring function.

5. The illuminance measuring system according to claim 2, wherein said illuminance measuring instrument has a spectral measuring function.

6. The illuminance measuring system according to claim 1, wherein said position measuring means further comprises an azimuth angle sensor.

7. The illuminance measuring system according to claim 1, wherein said illuminance measuring instrument has a spectral measuring function.

8. An illuminance measuring system comprising; an illuminance measuring instrument which comprises a first communication unit and is moved by a moving vehicle, a position measuring means which comprises a second communication unit and is capable of measuring a three-dimensional position of said illuminance measuring instrument and a data collector which comprises a third communication unit and a storage unit for storing positional information data of a predetermined measuring point, wherein said data collector moves said moving vehicle to said measuring point based on a position of said illuminance measuring instrument as measured by said position measuring means and said positional information data, an illuminance is measured by said illuminance measuring instrument and a position of said illuminance measuring instrument at the time of illuminance measurement is measured by said position measuring means, and wherein said data collector obtains an illuminance measurement result from said illuminance measuring instrument via said first communication unit and said third communication unit, obtains a measuring position from said position measuring means via said second communication unit and said third communication unit, and collects the illuminance measurement result and the measuring position in association with each other, and wherein said position measuring means is a GPS device as provided at a known position on said moving vehicle, a three-dimensional position of said illuminance measuring instrument is obtained by said GPS device, and said three-dimensional position of said illuminance measuring instrument is transmitted to said data collector via said second communication unit.

9. The illuminance measuring system according to claim 8, wherein said position measuring means further comprises an azimuth angle sensor.

10. The illuminance measuring system according to claim 8, wherein said illuminance measuring instrument has a spectral measuring function.

11. The illuminance measuring system according to claim 8, wherein said positional information data is sectioned by a mesh having predetermined intervals, and said data collector automatically moves said moving vehicle to said measuring point as specified by said mesh and controls said illuminance measuring instrument and said position measuring means so as to automatically perform the illuminance measurement and the position measurement of each measuring point.

12. The illuminance measuring system according to claim 11, wherein the illuminance measurement by said illuminance measuring instrument is executed with respect to all of said measuring points as specified by said mesh, and said data collector creates a three-dimensional illuminance distribution of said measuring points based on said illuminance measurement results and said position measurement results as collected.

* * * * *